United States Patent [19]

Johnson

[11] Patent Number: 5,346,549
[45] Date of Patent: Sep. 13, 1994

[54] ENVIRONMENTALLY STABILIZED PRODUCTS FORMED FROM ASH AND PAPERMILL WASTE

[76] Inventor: William B. Johnson, 209 Mississippi Dr., Monticello, Minn. 55362

[21] Appl. No.: 967,490

[22] Filed: Oct. 23, 1992

[51] Int. Cl.$^5$ .............................. C04B 7/12; C04B 7/24
[52] U.S. Cl. ........................ 106/708; 106/697; 106/709; 106/805; 106/DIG. 1; 588/252; 588/256; 588/257; 264/333
[58] Field of Search ......... 106/708, 709, 697, DIG. 1, 106/805; 588/252, 256, 257; 264/233

[56] References Cited

U.S. PATENT DOCUMENTS

| | | | |
|---|---|---|---|
| 3,188,751 | 6/1965 | Sutton | 34/12 |
| 3,962,080 | 6/1976 | Dulin et al. | 106/DIG. 1 |
| 4,157,696 | 6/1979 | Carlberg | 119/172 |
| 4,354,876 | 10/1982 | Webster | 106/708 |
| 4,586,958 | 5/1986 | Matsuura et al. | 106/708 |
| 4,874,153 | 10/1989 | Hashimoto et al. | 264/63 |
| 5,092,930 | 3/1992 | Fujisawa et al. | 106/708 |
| 5,092,931 | 3/1992 | Fujisawa et al. | 106/708 |

FOREIGN PATENT DOCUMENTS

| | | | |
|---|---|---|---|
| 430232 | 6/1991 | European Pat. Off. | |
| 51-015532 | 5/1976 | Japan | |
| 61-072667 | 4/1986 | Japan | 106/708 |
| 60-72668 | 4/1986 | Japan | 106/708 |
| 61-072670 | 4/1986 | Japan | 106/708 |
| 2267149 | 10/1990 | Japan | |
| 2283678 | 11/1990 | Japan | |
| 316949 | 1/1991 | Japan | |
| 1194854 | 12/1983 | U.S.S.R. | |

OTHER PUBLICATIONS

Journal Article Tokyo Kogyo Shimkensho Kokoku (TKSWAI) vol. 63(1) P. 1-50 1968.

*Primary Examiner*—Anthony Green
*Attorney, Agent, or Firm*—James V. Harmon

[57] ABSTRACT

The invention provides a novel formed product and method of producing a hard, dry, e.g., agglomerated or formed, product useful as a construction material comprising: a) papermill sludge made up of paper fiber, clay and calcium carbonate, b) ash such as coal ash (typically stack scrubber solids obtained from the burning of coal), and c) water. The amount of water present is selected to render the product plastic so that it can be molded to the desired shape. An oxidizer is provided in a sufficient amount to oxidize unstable compounds and to convert potassium, calcium or magnesium bisulfite to the sulfate form. Following the addition of the oxidizer, the admixture is exposed to electromagnetic energy, preferably ultraviolet light, to help drive the oxidation reaction to completion. In an optional form of the invention, a minor amount of a cation exchange resin is added to the mixture to sequester heavy metals. The admixture is formed or molded into pieces or bodies of the desired shape, such as blocks, slabs or pellets or agglomerates. The resulting pieces dry and harden at room temperature. They are unfused, contain retained wood fiber, are substantially dust free, hard, dry, and environmentally stable. They give off little or no objectionable odor. They are clean and when placed in water, will not release significant quantities of heavy metals. The formed bodies have enough strength to be used as an aggregate in a concrete product that exhibits good compression strength.

20 Claims, No Drawings

ENVIRONMENTALLY STABILIZED PRODUCTS FORMED FROM ASH AND PAPERMILL WASTE

FIELD OF THE INVENTION

The invention relates to products formed from waste, primarily coal ash and papermill waste.

BACKGROUND OF THE INVENTION

Several processes have been developed for producing aggregate from papermill waste and fly ash. For example, Japanese patent 76015532-B describes the production of a lightweight aggregate from papermaking sludge and fly ash, kraft pulp, lime sludge, waste clay or earth. An article in Tokyo Kogyo Shikensho Hokoku (TKSHAI), Volume 63(1), pages 1-50, 1968, also describes aggregate formed from fly ash and paper-pulp waste. In this case, pulp waste liquor, i.e., liquid waste, was mixed with the fly ash.

European patent EP 430 232-A (priority U.S. Ser. No. 443,156) describes ceramic prepared by forming a suspension of clay and water, adding ash and organic matter and dewatering to below 60% by weight, shaping the particles and firing at elevated temperature. The ash, however, is obtained from sewage sludge or paper containing 10% clay and the organic matter is papermill waste or sewage sludge.

Japanese patent 02283678-A describes the production of ceramic products by mixing or kneading silica fines with industrial waste, such as sewage sludge (ash), sludge from water treatment plants, crude refuse incinerated ash, crushed waste soil, fly ash, paper sludge, pulp waste liquid, and sediment from the sea or rivers. The product is molded and fired at an elevated temperature.

These prior products have certain shortcomings. First, the energy requirements are substantial due to the requirement for firing the aggregate in an oven. On the other hand, if high temperatures are not used for calcining the product, organic matter will render the aggregate biologically unstable. For example, unless aggregates containing papermill waste with a significant organic content are calcined at a high temperature to destroy the organic compounds, the resulting product is biologically unstable. Organic breakdown products that are present create bad odors and can otherwise contaminate the environment by leaching from the product and can also cause inferior strength. One objective is to eliminate these problems without the need for oven drying.

Prior products have been "fused" as by being calcined in an oven. Consequently, they do not contain fiber, the fiber having been converted to ash in the oven. This removes any cohesive strength that could otherwise have been imparted to the product by retained fiber.

Finally, aggregates previously manufactured are not regarded to be environmentally stable with respect to the presence of heavy metals which can also leach from the product into the environment. The heavy metals that are primarily of concern in products of this kind are lead, mercury, chromium, strontium and cadmium. The need to prevent heavy metals from entering the environment is becoming increasingly important.

In view of these and other shortcomings of the prior art, it is a primary object of the invention to provide a substantially environmentally stable product from ash, especially coal ash, and papermill waste, particularly papermill sludge containing, for example, a mixture of paper fibers, clay and calcium carbonate.

Another object of the invention is to provide a biologically stable product from waste consisting of fly ash and papermill sludge which can be dried at room temperature (e.g., about 50° F.–90° F.) rather than oven drying or calcining, thereby reducing energy requirements and yet producing an end product that will not contaminate the environment or emit bad odors.

Still another object is to provide an agglomerate or aggregate that can be used as a construction material and is lighter in weight than a standard aggregate such as that commonly employed in concrete.

These and other more detailed and specific objects of the invention will be apparent in view of the following specification which illustrates by way of example but a few of the various forms of the present invention that will be apparent to those skilled in the art within the scope of the appended claims.

SUMMARY OF THE INVENTION

The invention provides a method of producing a hard, dry, e.g., aggregated product useful as building material from an admixture of ash such as coal ash, e.g., fly ash or stack scrubber solids, and papermill waste, e.g., papermill sludge. A minor amount of water is provided or maintained in the admixture to give it a plastic consistency that enables it to be formed or molded into pieces such as pellets.

In the chemical digestion of paper pulp that is one form of papermill waste used herein as a raw material, calcium sulfite or magnesium sulfite is usually used. In one preferred form of the invention, an oxidizer is added to the composition in a sufficient amount to oxidize unstable compounds and convert sulfite ions, when present, to the sulfate form. Following the addition of the oxidizer, the admixture is preferably exposed to electromagnetic energy, preferably ultraviolet light, to help drive the oxidation reaction just described to completion.

In an optional form of the invention, a minor amount, e.g., usually about 0.01% to about 1.0% of an ion exchange resin is also added to the mixture for the purpose of sequestering heavy metals.

The water that is provided by addition or that is already present in the paper sludge renders the admixture plastic, i.e., a deformable mass which can be formed into pieces or bodies of the desired shape, such as blocks, slabs, pellets or agglomerates typically about one-fourth inch to about one-half inch in diameter.

The present invention provides a new agglomerated product in the form of a molded, unfused body, pellet or agglomerate that comprises about 3-7 parts ash such as coal ash, and the balance about 7-3 parts papermill sludge containing retained fiber to make a total of 10 parts. The retained wood fiber imparts cohesive strength to the product. In this way, the invention makes full use of the ability of the retained fiber to unify the product and improve its strength even though it is unfused. The resulting bodies, pellets or pieces, e.g., agglomerates are allowed to dry and harden at room temperature. The agglomerates are substantially dust free, hard, dry, environmentally stable and give off little or no objectionable odor. They are clean and when placed in water, will not release significant quantities of heavy metals. The aggregate bodies have satisfactory strength for a variety of uses, e.g., for producing a concrete product with a compression strength that is typically about 1900 psi (ASTM Test #39–86).

An important advantage of the invention is that it facilitates a pozzolanic reaction during the drying step akin to the setting of portland cement, i.e., an irreversible chemical combination of inorganic constituents which produces a hardening of the rock-like final product to improve its strength and reduce the solubility of its constituents.

In one preferred form of the invention, the following constituents are mixed together in the first stage of the process: a) about 3–7 parts papermill sludge which typically is made up of about 25% clay, 25% calcium carbonate and 50% wood fiber dry basis, b) about 7–3 parts ash such as coal ash (e.g., stack scrubber solids obtained from the burning of coal), and c) a minor amount of an oxidizer to make a total of 10 parts. Typically, about 0.5–2 parts water are maintained in the composition. The water, however, is provided or maintained only in an amount sufficient to render the product plastic so that it can be formed, shaped or molded to the desired shape.

All quantities herein are expressed as parts or percent by weight. Percentages and ratios of the admixture will be expressed on a wet basis, i.e., including water.

DETAILED DESCRIPTION OF THE INVENTION

Sources of Waste Material

The primary waste material is ash, such as that obtained from burning coal, especially the fly ash obtained from a coal burning plant. One fly ash sample from burning Western coal had the following analysis: 5% silica ($SiO_2$), 28% alumina ($Al_2O_3$), 5% lime (CaO), 3% ferric oxide ($Fe_2O_3$), 1.4% titania ($TiO_2$) with the balance made up of other trace minerals. Since other ash materials are also useful in the invention, there is no intention to limit the composition to the foregoing analysis which is presented merely by way of example. The fly ash is a dry, dark-colored hygroscopic powder that may contain trace amounts of heavy metals such as Pb, Hg, Cr, Sr and Cd which are the most troublesome. The fly ash also contains a minor amount of moisture, e.g., less than about 1.0%. Optionally, the fly ash can be collected in a stack gas scrubber in which ground limestone and/or quick lime (CaO) is added to the gas. When dissolved in water, CaO is present as calcium hydroxide [$Ca(OH)_2$]. The amount of CaO added is about 0.1 pounds per pound of stack gas solids.

The second waste product is papermill waste such as sludge from a sulfite papermill or from a ground-wood mill. One typical papermill waste from a sulfite mill contains about 2 parts paper fiber, about 1 part clay, and about 1 part calcium carbonate (dry basis). The sludge also contains about 50% moisture and a minor amount, e.g., about 1%–3% by weight sodium bisulfite, calcium bisulfite, potassium bisulfite or magnesium bisulfite. One typical sulfite papermill sludge contained 1% potassium bisulfite.

Optionally, there is also added a metal-binding composition or heavy metal sequestering agent such as an ion exchange resin, e.g., a cation exchange resin. One example is a cation exchange resin known as Zeo-Rex ® from the Permutit Company. While the amount of ion exchange resin used will vary depending upon the heavy metal contaminants and the quantity of metal present, it is typically used in an amount from about 0.01% to about 1.0%. The ion exchange resin becomes more efficient as the atomic number and valent state of cations present increases. Thus, less is required with ions of higher atomic number. It should be noted that the oxidizer helps drive the metal ions to their highest valent states, assuring efficient action of the ion exchange resin.

These two waste products are uniformly mixed together with a minor amount of an oxidizing agent. A variety of oxidizing agents can be employed. Examples are perborate oxidizers such as sodium perborate ($Na_2BO_4$) in the amount of about 0.1%. Other oxidizers can also be used, such as sodium hypochlorite ($Na_2Cl_2O_7$), calcium hypochlorite ($CACl_2O_7$), sodium percarbonate ($Na_2CO_3.H_2O_2$), calcium percarbonate ($CaCO_3.H_2O_2$), hydrogen peroxide ($H_2O_2$), and calcium peroxide, among others. Quick lime (CaO) may make up about 5% of the fly ash. The oxidizing agent is preferably used in an amount of about 0.01% to about 10% and typically about 0.05% to about 3.0%. The oxidizer can be used with the lime that has been added to the fly ash to drive up the pH, typically from an original pH of about 5.0 to a pH with oxidizer and lime present of about 9.5. When lime is contained in the ash used in the present process, it renders the sulfate anions relatively insoluble. If the fly ash that is being used is modified by the addition of lime to the stack gases, about 0.3 pounds of crushed limestone and about 0.1 pounds of lime (CaO) are usually mixed with about 1.0 pounds of fly ash in the stack gases. The present invention can be used with ordinary fly ash or with fly ash that is modified by the addition of lime in this manner.

Mixing of Waste Products, Oxidizer and Sequestering Agent

Mixing can be accomplished in a variety of ways. One preferred method is to mix the "dry" constituents, e.g., about 2 parts papermill waste and about 2 parts fly ash with a relatively small quantity of oxidizer and, if desired, with the optional heavy metal sequestering agent by passing them together through a high speed mixer such as a high intensity turbulator mixer which consists of a horizontal cylindrical mixing chamber having a diameter of about 12 inches and a length of 40 inches with a multiple-bladed impeller rotating at 1740 rpm, e.g., a Model 33T111 turbulator by Ferro-Tech Company of Wyandotte, Mich. Material will pass through the turbulator in about three seconds and emerges as a loose, fluffy admixture which is fed onto a conveyor as a layer, typically about one inch thick.

This loose, fluffy layer is then preferably exposed to electromagnetic energy, e.g., ultraviolet radiation, for a sufficient time to facilitate the oxidation reaction. In one application, a layer two inches thick was exposed to six ultraviolet bulbs of 100 watts each for five seconds. The bulbs were placed six inches above the product. In this reaction, the sulfite ion is oxidized to the sulfate ion, forming harmless metal sulfates. Upon exposure to ultraviolet radiation, the sulfite will be converted to sulfate in about five seconds. In this reaction at least 85%, and usually over 95% of the sulfite, e.g., in the calcium salt is converted to sulfate (gypsum).

Papermill waste also contains organic material, primarily in two forms: papermill waste liquor which contains lignins, saccharides and other compounds, and organic solids, primarily paper fibers. It is primarily the former that are unstable. The oxidizer was found to be particularly effective in stabilizing organic compounds present in the papermill waste. It kills back resident biological populations, it raises the pH, and it binds water to create an environment that is inhospitable to microbial growth. It also oxidizes reactive sites on the organic molecules, rendering them stable.

Following the addition of the oxidizer, the organic papermill waste is surprisingly stable. It exhibits little or no objectionable odor and environmental contaminants are not subject to being leached from the cured aggregate following drying.

Forming or Molding

Following the exposure of the admixture to ultraviolet radiation, the material which is then in a plastic form is fabricated into products such as pellets. Forming or molding can be conveniently accomplished with a pan-type pelletizer such as a disc pelletizer by the Ferro-Tech Company of Wyandotte, Mich., in about one to five minutes. A quantity of water is added at this point unless sufficient water is already present. In the pan pelletizer, a small amount, usually about 5% of added water is sprayed onto the admixture to facilitate agglomeration of the particles as the pan rotates at 25 RPM. In one typical product, about 0.38 pounds of water will then be present for each pound of dry solids in the combined papermill sludge and fly ash. The terms "molding" and "forming" are used broadly herein to refer to shaping of the product by any means and does not necessarily infer that a mold is used to shape the product. In the pan pelletizer, the pellets are formed by the accretion of moist material to form globs which gradually increase in size as the pan rotates. The resulting bodies pass out of the pelletizer as aggregates, i.e., pellets that are about 3/32nd inch to about 1 inch in diameter and most preferably about ¼ inch to about ½ inch in diameter. The size and shape of the pellets will depend upon the application to which they are to be placed. The pellets can be sized and outsized pellets pulverized for recycling if desired. In a modified form of the process, the plastic material is formed into larger bodies; i.e., panels, sheets, cylinders, blocks or pieces of any other desired shape using suitable roll forming or extruding equipment known in the art.

Drying

The finished pieces are dried at ambient, i.e., room temperature, typically 50° F. to 90° F. and need not be oven dried. The pozzolanic reaction described hereinabove begins to take place when water is added so as to reduce solubility and harden the product. The resulting product can be used as a construction material. It is dry, virtually rock-hard, does not have an obnoxious odor, is dust free, and can be considered environmentally stable in the sense that it does not degrade or leach harmful contaminants into the environment. In one preferred form of the invention up to about 10% by weight, e.g., 0.5% to 10% by weight, portland cement is added during mixing to further increase the strength of the final product.

The invention will be better understood by reference to the following examples.

Example 1

| | Parts by Weight | |
|---|---|---|
| | Preferred Range | Typical |
| Fly Ash[1] | 30–70 | 50 |
| Papermill Sludge[2] | 70–30 | 49.5 |
| Sodium perborate | .1–2 | 0.5 |
| | 100 | 100 |

During agglomeration about 5% by weight added water is sprayed on the product.

Example 2

| | Parts by Weight | |
|---|---|---|
| | Preferred Range | Typical |
| Fly Ash[1] | 30–70 | 59.5 |
| Papermill Sludge[2] | 70–30 | 40 |
| Sodium percarbonate | .1–2 | 0.5 |
| | 100 | 100 |

During agglomeration about 8% by weight added water is introduced.
[1] One fly ash sample obtained from buring Western coal had the following analysis: $SiO_2$, 45.3%; $Al_2O_3$, 28.7%; CaO, 5.2%; $Fe_2O_3$, 2.93%; $TiO_2$, 1.44%; $K_2O$, 1.39%; $P_2O_5$, 1.32%; MgO, .80%; $SO_3$, .80%; $Na_2O$, .46%; $Mn_3O_4$, .14%; BaO, .11%
[2] Paper fiber, 2 parts; calcium carbonate, 1 part; clay, 1 part; water, 4 parts; potassium bisulfite, 2% by weight

Example 3

| | Parts by Weight | |
|---|---|---|
| | Preferred Range | Exemplary |
| Fly Ash[1] | 30–70 | 30 |
| Papermill Sludge[2] | 70–30 | 69 |
| Hydrogen peroxide | .5–3 | 1 |
| | 100 | 100 |

During agglomeration 10% by weight water is added.

Example 4

| | Parts by Weight | |
|---|---|---|
| | Preferred Range | Exemplary |
| Fly Ash[1] | 30–70 | 50 |
| Papermill Waste[3] | 70–30 | 49.5 |
| Cation Exchange Resin | .5–3 | 1 |
| Sodium hypochlorite | .1–2 | 0.5 |
| | 100 | 100 |

Just before molding, about 5% by weight of added water is introduced.

Example 5

| | Parts by Weight | |
|---|---|---|
| | Preferred Range | Exemplary |
| Fly Ash[1] | 30–70 | 68.85 |
| Papermill Waste[3] | 70–30 | 30 |
| Cation Exchange Resin | .5–3 | 1 |
| Calcium hypochlorite | .1–2 | 0.15 |
| | 100 | 100 |

Just before molding, about 8% by weight of added water is introduced.

Example 6

| | Parts by Weight | |
|---|---|---|
| | Preferred Range | Exemplary |
| Fly Ash[1] | 30–70 | 49.5 |
| Papermill Sludge[2] | 70–30 | 50 |
| Calcium peroxide | .1–2 | 0.5 |
| | 100 | 100 |

During agglomeration, about 5% by weight added water is introduced.
[3] 50% dry ingredients (paper fiber, 50%; clay, 50%) and 50% water.

Commercial Application

When the product is formed into agglomerates or pellets, it can be used as a building material in the same manner that ordinary aggregate is used to serve as a lightweight constituent in concrete. In this application, it is used in the amount of about 40–60% by weight of the concrete, the balance being 20–30% sand and 15% portland cement. Water is added to provide the desired consistency. The resulting concrete can, of course, be used in any of its usual applications, e.g., in the construction of buildings, precast concrete structures, blocks, and other concrete products which will be apparent.

If the product is formed into slabs, panels, blocks or larger bodies, it can be employed in any suitable application for which such panels or slabs are adapted, for example, wallboard, exterior and interior sheeting, and tile underlayment.

Many variations of the present invention within the scope of the appended claims will be apparent to those skilled in the art once the principles described above are understood.

What is claimed is:

1. A method of producing environmentally stable formed bodies useful as an unfused building material including as ingredients, ash and papermill waste containing cellulose fiber and clay, said method comprising, admixing about 3-7 parts by weight of said ash and 7-3 parts by weight of said papermill waste to make a total of 10 parts by weight with an oxidant in an amount effective to promote oxidation of at least a portion of the admixture, providing or maintaining in said admixture a sufficient amount of water to render the admixture plastic, thereafter forming the plastic admixture into bodies, and allowing the formed bodies to harden to provide an environmentally stable product.

2. The method of claim 1 wherein the ash is an ash resulting from the burning of coal and said ash contains silica and alumina, lime, ferric oxide and titania.

3. The method of claim 1 wherein the papermill waste is papermill sludge that comprises on a dry basis about two parts paper fiber, about one part clay, about one part calcium carbonate, and about 2% by weight of sulfite salt.

4. The method of claim 1 wherein the oxidant comprises at least one member selected from the group consisting of sodium perborate, sodium percarbonate, sodium hypochlorite, calcium hypochlorite, calcium percarbonate, hydrogen peroxide and calcium peroxide.

5. The method of claim 1 wherein the plastic admixture is exposed to electromagnetic radiation prior to hardening.

6. The method of claim 1 wherein the admixture contains heavy metal ions and a heavy metal sequestering agent comprising an ion exchange resin is added to said admixture, and the oxidant raises the metal ions to their highest valent state for enhancing the action of the ion exchange resin.

7. The method of claim 6 wherein the ion exchange resin comprises a cation exchange resin.

8. The method of claim 5 wherein the electromagnetic radiation is ultraviolet radiation.

9. The method of claim 1 wherein the hardening of said admixture is carried out at ambient temperature and without the use of a drying oven.

10. The method of claim 8 wherein the ultraviolet radiation is applied to the admixture after an oxidizer is admixed therewith.

11. The method of claim 1 wherein said bodies undergo an irreversible pozzolanic hardening reaction in which the solubility of the formed bodies is reduced and their hardness is enhanced.

12. The method of claim 1 wherein portland cement is contained in the admixture in an amount sufficient to increase the strength of the product.

13. A formed product useful as a building material comprising about 7-3 parts by weight ash, b) about 3-7 parts by weight papermill waste sludge containing retained wood fiber and clay and a sulfur-containing salt, wherein the sum of a) and b) makes a total of 10 parts by weight, said product being formed into a hard, unfused, environmentally stable body wherein said retained wood fiber imparts cohesive strength to the body and at least about 85% of sulfur-containing ions present are converted to a sulfate.

14. The formed product of claim 13 wherein the said product comprises an unfused agglomerate comprising about equal parts of a) an ash comprising stack gas scrubber solids and b) papermill sludge, said papermill sludge (dry basis) includes about 2 parts wood fiber, about 1 part clay, about 1 part calcium carbonate and a minor amount of a sulfur salt of one of the following: calcium, potassium, sodium or magnesium.

15. The formed product of claim 13 wherein about 0.01% to about 3% by weight cation exchange resin is present in said product.

16. The formed product of claim 13 wherein portland cement is contained in said product in an amount sufficient to increase the strength of the product.

17. The formed product of claim 13 wherein the building material is a panel.

18. The formed product of claim 13 wherein the building material is a cylinder.

19. The formed product of claim 13 wherein the building material is a block.

20. The formed product of claim 13 wherein the building material is a pellet.

* * * * *